Nov. 13, 1945.  H. G. REICHEL  2,389,113
SCALE MECHANISM
Filed Sept. 23, 1942

Howard G. Reichel
INVENTOR
BY R. G. Story
ATTORNEY

ATTEST-
Wm C. Meiser

Patented Nov. 13, 1945

2,389,113

UNITED STATES PATENT OFFICE 2,389,113

SCALE MECHANISM

Howard G. Reichel, Chicago, Ill., assignor to Industrial Patents Corporation, Chicago, Ill., a corporation of Delaware Application September 23, 1942, Serial No. 459,345

3 Claims. (Cl. 249—2)

This invention relates to a means associated with a weighing system for measuring a predetermined percentage of the weight of an object placed on the receiving platform of the weighing system and more particularly provides means for selectively exerting an influence on the weighing system for producing a variation of weight equal to a percentage increment of the weight of an article disposed on the scale platform.

It is an object of this invention to provide a weighing system for selectively indicating an increment of weight equal to a given percentage of an object being weighed.

It is another object of this invention to provide for automatic means associated with a scale whereby an increment of weight, equal to a given percentage of the weight of an object being weighed, may be automatically delivered to the scale platform.

In many mixing operations the components of the mixture are determined on a percentage basis and if one material predominates, the remaining components may be expressed as a per cent by weight or volume etc., of the base material. The present invention is concerned with means for automatically measuring a given percentage of a base material to determine the amount that must be added and, in describing this invention, its use as applied to the pumping of curing pickle into hams will serve as a typical example.

One method of curing a ham involves the pumping of a pickling fluid into the vascular system of the product in order to obtain a more thorough and rapid impregnation of the meat and it is necessary, in following this process, to add to each ham, a certain amount of pickling fluid depending upon the weight of the ham. As now practiced, the operator weighs the ham, notes the weight of the product, and then consults a chart to determine the amount, by weight, of pickling fluid to be added. This involves a mental operation on the part of the operator and therefore, there is a possibility that an error may be made.

The present invention provides means to automatically measure the percentage of weight which must be added whereby to inject the proper amount of pickling fluid into a ham. The invention described below is based upon the use, in connection with the weighing system, of a pair of relatively displaceable elements with means to selectively create a motivating force between them. At least one of these displaceable elements is operatively fixed to the weighing system to move with it and to transmit the attractive force to the system. The amount of this force is directly proportional to the amount of relative displacement produced between these elements. Thus a relative displacement takes place when an article is placed on the scale and, the elements being moved by the weighing system, the amount of displacement is determined by the weight of the article. The displacement being controlled by the weight of the article, and as the degree of the motivating force is proportional to the displacement, a force is transmitted to the weighing system which may be made to be exactly proportional to the weight of the article causing the displacement. It is to be noted that this force may be made to manifest itself in a positive or negative manner on the indicating system of the scale, but in pumping hams, as will appear below, the force tends to act against the direction of the force established by the article on the weighing system.

Figures 1, 2, 3:
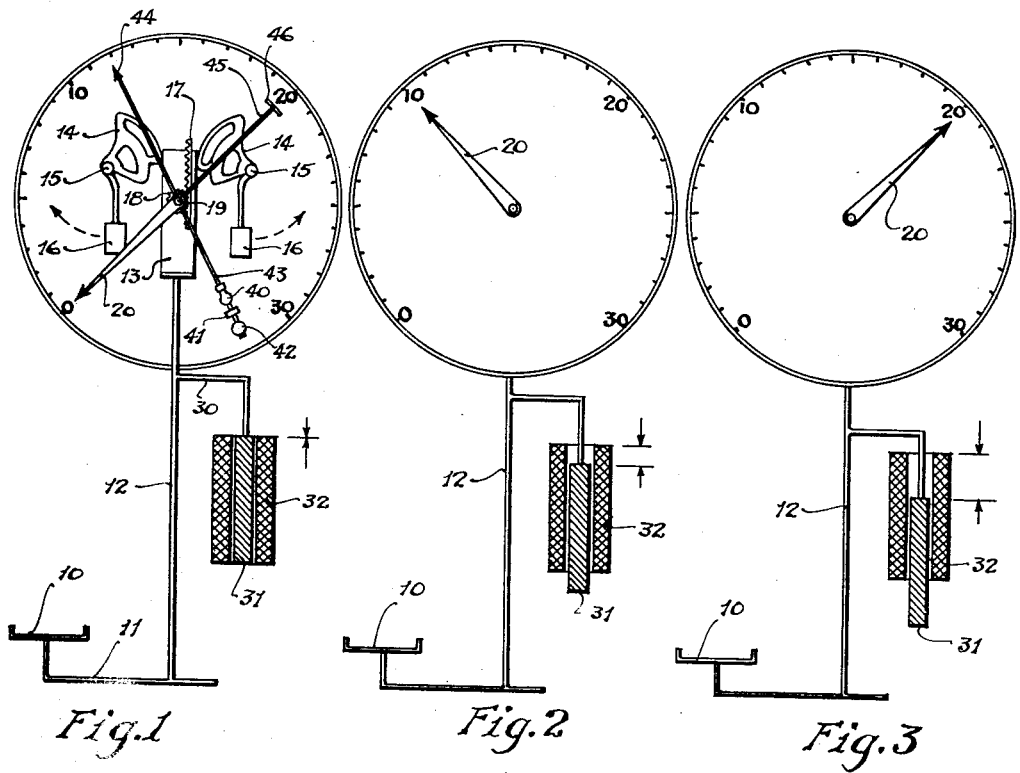
Figure 1 is a diagrammatic view of the preferred form of the scale mechanism with the elements disposed in the position they occupy when the scale pan is empty.
Figure 2 is a diagrammatic view of the scale elements when a ten pound weight has been placed on the scale platform.
Figure 3 is a diagrammatic view of the same scale elements when a twenty pound weight has been placed on the scale platform.

In Figure 1 is shown a conventional scale construction equipped with this invention, and the scale is provided with a scale pan 10 upon which the article to be weighed may be disposed. The weight of the article in the pan is transmitted through suitable mechanisms to the weighing system of the scale, for example, the scale pan 10 may be mounted on one end of the lever 11 and as the pan 10 moves downwardly under the influence of the weight, the rod 12 is pulled downwardly. The upper end of rod 12 is connected through flexible straps to the counterweighted levers 14 each of which is pivotally secured to the frame of the scale about an axis 15.

When rod 12 moves downwardly, the straps 13 rotate the levers 14 and as the counterweighted levers are rotated about the axis 15, the weights 16 are driven outwardly with respect to the axis 15 until the counter rotating force resulting from so positioning weights 16 balances the weight placed on the pan whereupon equilibrium conditions are established.

Rod 12 has a rack 17 integral therewith, the rack engaging a suitable pinion 18 such that as rod 12 moves downwardly, the pinion is rotated. A shaft 19 is keyed to the pinion and an indicator arm 20 is fixed to rotate with the pinion. The arm 20 cooperates with suitable indicia placed around the dial and provides a visual indication of the amount of weight placed on the scale. This is all a conventional scale structure of a well known type.

Rigidly secured to the rod 12 and laterally extending therefrom is a bracket support 30 to which is affixed the cylindrical element 31 of magnetic material which forms the core of a solenoid structure. The core 31 is preferably fixedly disposed with respect to the rod 12 and moves in a direction substantially longitudinal of its axis when the rod 12 is reciprocated due to the placement of a weight on the platform 10, but it will be seen that other operative connections between the core and rod could be provided.

A coil 32 fixedly secured to the frame of the scale is mounted to cooperate with the core 31 and the coil 32 is preferably maintained in a relatively stationary position while the core 31 moves with the rod 12. The displacement produced between these elements is shown particularly in Figures 2 and 3, and when a weight is placed on the scale platform, the core 31 will be displaced with respect to the coil 32 to a greater or less extent. If the coil is fixed while the core moves with rod 12, the amount of the displacement is exactly the same as the movement of the rod 12 under the influence of the weight on the scale pan.

If an electrical current is passed through the coil, when the core is displaced from its central position with respect to the coil, the magnetic field created by the current flowing through the coil tends to draw the core of magnetic material back to its central position so that the poles created in the core will be aligned with the poles of the coil. The degree of the attractive force increases as the core is displaced more and more from its central position with respect to the coil and by a proper adjustment of the dimensions of the coil, core, and the current, the attractive force can be made to increase in direct proportion to the amount of the displacement.

With this construction, the rod 12 is moved further in a downward direction as a greater weight is placed on the scale pan 10 and the core 31 is displaced farther from within the coil 32 so that a larger attractive force is produced tending to draw the core back into its original position. The attractive force between the coil 32 and the core 31, transmitted to the rod 12 through bracket 30 tends to lift the rod 12 and thus counteracts a portion of the force being transmitted to the weighing levers 14 such that the pointer 20 will give an indication of the weight of the article on the weighing pan, the indication being diminished by the amount of this attractive force. If a switch is provided in the circuit through the coil 32, the attractive force can be selectively created when desired.

In the operation of the device so far described, if a ham to be pumped is placed on the scale, the circuit through the coil 32 is broken and the ham is weighed in the usual manner. It is to be understood that the scale is properly compensated so that when the coil is de-energized, the bracket 30, core 31, and coil 32 have no influence whatsoever on the indication given by pointer 20. As soon as the indicator 20 has reached a stationary position and its weight noted, a flow of current is established through the coil 32 and an attractive force is exerted on the core 31 which has been displaced from within the coil. The attractive force as above explained tends to lift the core 31 and the rod 12 to remove a portion of the load being transmitted to the weighing system. The attractive force being directly proportional to the amount of displacement caused between the core 31 and the coil, the lifting force bears a direct percentage relationship to the weight indicated on the dial. As this attractive force is applied to the weighing system, it will cause the pointer to be retracted and the pointer will not return to its original weight indication while the coil is energized until the desired additional weight has been added to the scale pan.

After the original weight and the percentage increment of the weight have been determined, pickling fluid may be pumped into the ham. The solenoid is maintained energized and the pumping is continued until the rod 12 is again moved downwardly by the addition of pickling fluid a distance equal to that through which it was lifted when the coil was energized. In this manner, when an additional amount of weight has been added to the product such as is sufficient to overcome the influence exerted by the attraction of the coil on the core, the indicator will be driven back up to the original weight registered.

In using the above described construction, it is necessary for the operator to note down or to remember the starting weight. If it is desired to avoid even this effort on the part of the operator, a photoelectric cutoff circuit can be associated with the scale dial to automatically close the valve in the pumping system when the proper weight of pickling fluid has been added to the ham.

Figure 4:
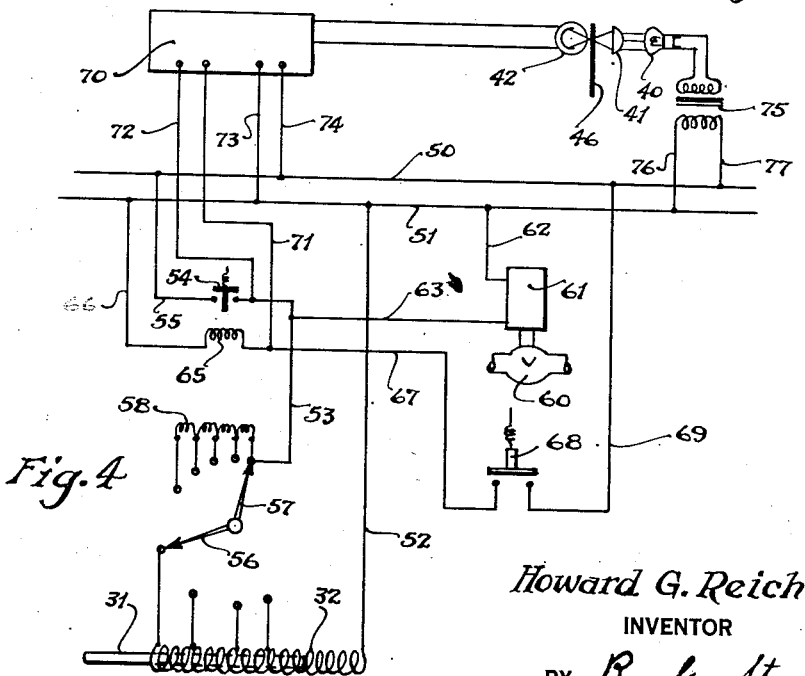
Figure 4 shows a wiring diagram associated with the scale and including valve actuating means for accomplishing certain automatic operations.

Referring to Figures 1 and 4 a photoelectric system comprising a light source 40, condenser lens 41, and a photoelectric cell 42 may be mounted at the end of the pivoted arm 43. The arm 43 is rotatably mounted about the axis 19 and is provided with a pointer 44. The scale indicator 20 may also be provided with an arm 45 diametrically disposed with relation to indicator arm 20 and at its outer end, the arm 45 carries an opaque vane 46. The arm 43 carrying the photoelectric system and arm 45 both turn about the axis 19 of the scale pointer and the opaque vane 46 is disposed lengthwise along arm 45 to cooperate with the light beam of the photoelectric system.

When using the photoelectric cutoff mechanism, the operator weighs the product and observes its initial weight, whereupon the pointer 44 is set in alignment with the indicator 20. The coil 32 may then be energized to cause the scale pointer to be deflected backwardly, and after that, if the product is a ham to be pumped, the pumping operation may be started. As the weight of the ham being pumped increases, the pointer 20 will approach the pointer 44 and the vane 46 will approach the photoelectric system. As soon as the vane 46 interrupts the light stream, suitable relay means are operated to cut off the valve controlling the flow of fluid to the ham.

As stated above, the attractive force created by the solenoid may be controlled by varying the current flowing through the coil, or by selectively connecting any number of turns of the coil into the circuit. By well known design methods, the attractive force created between the core and coil for any given displacement can be varied through a suitable range to give any desired percentage range. In the pumping of hams for example this range covers from eight to as much as twelve or fourteen per cent by weight of pickling fluid depending upon the type of the ham. To obtain the desired variations in the attractive force, the circuit is provided with means for controlling the current delivered to the coil and means for selectively connecting any desired number of turns of the coil into the energizing circuit.

An electrical circuit for varying the current supplied to the coil 32 and also for operating the relay means controlled by the photoelectric system is shown in Figure 4. In this circuit, the coil 32 is shown connected across the supply leads 50 and 51 through the conductor 52 and 53, the switch 54 and conductor 55. When the switch 54 is moved to complete the circuit, the current will pass through the coil 32 and if the circuit is set up as shown in Figure 4, the maximum attractive force between the core and the coil is generated.

To vary the attractive force, a contactor arm 56 is connected between the coil 32 and conductor 53 whereby any number of coils may be selected to create the desired magnetic force. Also a contactor 57 may be connected in series between the contactor 56 and the conductor 53, the contactor 57 controlling the passage of current through the resistor elements 58.

The circuit is operative to control the fluid valve 60 in the pickling supply line and valve 60 is actuated by a solenoid 61 connected across the leads 50 and 51 by conductors 62 and 63, the latter being connected in series with the switch 54 and conductor 55. The switch 54 is controlled by a solenoid 65 which is connected across the leads 50 and 51 through the conductors 66, 67, switch 68 and conductor 69.

Solenoid 65 is also connected into a holding circuit through the relay means 70 of the photoelectric system by leads 71 and 72 whereby once the switch 54 is actuated by the energization of solenoid 65, the switch is maintained in this position until the light beam of the photoelectric system is interrupted. The leads 71 and 72 are connected through the circuit making means in relay device 70 so that until the electrical condition of the photoelectric cell is changed, current flows from line 50 through conductor 55, switch 54, lead 72, relay device 70, lead 71, solenoid 65, and conductor 66 to line 51.

The relay device 70 is energized from leads 50 and 51 through leads 73 and 74 and the light source 40 is energized through the transformer 75 and leads 76 and 77.

The photoelectric system and circuit cooperate with the scale and after a ham has been weighed, and the pointer 44 of the photoelectric system set to coincide with the scale pointer 20, the switch 68 is manually depressed to establish a circuit from line 50 through conductor 69, switch 68, conductor 67, solenoid 65, conductor 66 to line 51. Current passing through the solenoid effects an actuation of switch 54. The closing of switch 54 completes a circuit from line 50, conductor 55, switch 54, conductor 63, solenoid 61, conductor 62, to line 51 to complete a circuit for energizing the solenoid 61 to open valve 60 so that pickling fluid may be admitted to the ham.

The closing of switch 54 also completes a circuit through coil 32 and this circuit may be traced from line 51 through conductor 52, coil 32, contactor arms 56 and 57, conductor 53, switch 54, and conductor 55, to line 50. Thus an attractive force is established between the core 31 and the coil 32 simultaneously with the initiation of the pumping operation and the attractive force, transmitted to the weighing system, will maintain the indicator 20 below the original indication given until the predetermined percentage of weight has been added to the ham.

When the proper increment of weight has been added, the indicator 20 will coincide with the indicator 44 and vane 46 will have passed into the stream of light flowing to the photoelectric cell. When vane 46 interrupts the light stream, the photoelectric cell acting through the relay device 70 functions to break the holding circuit established through solenoids 65. The holding circuit being broken, the solenoid 65 will become de-energized and the switch 54 will open. When switch 54 opens, the circuits through the solenoid 61 of valve 60 and the coil 32 on the scale are broken. In this manner, the pumping operation is controlled.

Thus it will be seen that an entirely automatic means has been provided such that once the original weight of an article is known, the control circuit may be set in operation to actuate the various elements as the pumping proceeds whereby the flow of pickle will be cut off as soon as the desired percentage by weight has been added to the ham.

The above example shows one manner in which this invention may be utilized. It is considered obvious that it may be adapted to many other uses wherein one material is to be added to, or a given percentage of weight is to be subtracted from a larger mass of a material. In the latter instance, instead of applying the attractive force to the rod 12 in a manner to absorb a portion of the weight on the scale, the motivating force to give the percentage variation should be applied to the rod so as to add to the weight indication whereby as a portion of the mass is removed from the scale pan, the indicator 20 will return to the weight originally indicated.

Further, if the core 31 is permanently magnetized or if it is magnetized by means other than coil 32, by disposing like poles of the core and coil adjacent each other when the core is disposed centrally of the coil, the core may be made to cooperate with the coil 32 such that upon the establishment of a current flow through the coil, a force of repulsion is set upon between these elements. This repulsion force may be applied to the rod 12 to accomplish the desired result. In creating either an attractive force or a repulsive force, the force may be applied to the rod 12 either directly or through a leverage system to add to or subtract from the weight indicated on the scale dial by the scale pointer for the purposes suggested above.

It is not necessary that the coil be fixed and it is obvious that the core and coil may be both mounted on relatively movable elements of the scale mechanism to create the desired reaction in the weighing system.

In its preferred form, the invention has been shown as applied to a scale mechanism. The principle, however, may be applied to any force measuring system where the system reaches a static position under the influence of the force. The attractive force created in the solenoid may be applied to the force measuring system to either add to or subtract from the stress produced in the system to give a desired percentage variation from the original indication.

Many other modifications may occur to one skilled in the art. All such modifications are contemplated to be within the scope of the following claims.

I claim:

1. The combination of a weighing mechanism having indicating means associated therewith and means to measure a predetermined percentage of the weight of any object placed on the weighing mechanism, said means to measure including a core of magnetic material, a coil cooperating with said core, said core being relatively movable with respect to said coil, and one of said relatively movable elements being operatively connected to said mechanism, said core being relatively movable from a central position with respect to said coil to positions progressively displaced from said central position as the weight of the object being weighed is increased, means for selectively creating a current of electricity through said coil to establish a magnetic field for attracting the core, said coil being dimensioned so that the amount of the attractive force is directly dependent on the displacement produced between said core and said coil, said attractive force being transmitted to the weighing mechanism through the fixed connection between said one element and said mechanism.

2. The combination of a weighing mechanism and automatically controlled means for varying the weight of an object placed on the weighing platform of the mechanism comprising a weighing system including an indicating means, means to measure and cause said indicating means to register an increment of weight equal to a predetermined percentage of the weight of any object placed on the weighing mechanism, said means to measure including a core of magnetic material, a coil cooperating with said core, said core being relatively movable with respect to said coil, and one of said relatively movable elements being operatively connected to said mechanism, said core being relatively movable from a central position with respect to said coil to positions progressively displaced from said center position as the weight of the object being weighed is increased, means for selectively placing said measuring means in operation, by creating a current of electricity in said coil to establish a magnetic field for attracting the core, said coil being dimensioned so that the amount of the attractive force is directly dependent on the displacement produced between said core and said coil, said attractive force being transmitted to the weighing mechanism through the fixed connection between said one element and said mechanism, said selective means being also effective to establish the operation of said weight varying means, and means responsive to the position of the indicating means for controlling said means for varying the weight of the object to stop the operation of said weight varying means when a change in weight equal to said predetermined percentage increment has been attained.

3. The combination of a weighing scale mechanism having indicating means and a dial, and means to measure a predetermined percentage of the weight of any object placed on the scale; said means to measure including a pair of relatively movable elements displaceable one with respect to the other; at least one of said elements being operatively connected to and movable with the mechanism to effect a displacement between said elements proportional to the weight of the object; and means for selectively creating a motivating force between said elements with the amount of the force being dependent on the displacement produced between said elements; said motivating force being transmitted to said mechanism through said operative connection to move the indicating means across the dial; and said relatively movable elements being constructed and arranged such that when the weight being measured is altered by an amount equal to said predetermined per cent after the motivating force has been established, the indicating means will return to the original point it occupied with respect to the dial.

HOWARD G. REICHEL.